United States Patent
Derebail et al.

(10) Patent No.: US 10,346,777 B2
(45) Date of Patent: Jul. 9, 2019

(54) CROSS DOMAIN INTEGRATION IN PRODUCT LIFECYCLE MANAGEMENT

(71) Applicant: International Business Machines Corporation, Armonk, NY (US)

(72) Inventors: Annap Derebail, Roswell, GA (US); Amaresh Rajasekharan, Cortlandt Manor, NY (US); Man Mohan Singh, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1024 days.

(21) Appl. No.: 13/847,012

(22) Filed: Mar. 19, 2013

(65) Prior Publication Data

US 2014/0288994 A1 Sep. 25, 2014

(51) Int. Cl.
*G06Q 10/06* (2012.01)

(52) U.S. Cl.
CPC ... *G06Q 10/06316* (2013.01); *G06Q 10/0637* (2013.01)

(58) Field of Classification Search
None
See application file for complete search history.

(56) References Cited

U.S. PATENT DOCUMENTS

| | | | |
|---|---|---|---|
| 5,414,833 A * | 5/1995 | Hershey | H04L 63/145 726/22 |
| 7,873,607 B1 | 1/2011 | Knutson et al. | |
| 8,225,308 B2 | 7/2012 | Sedukhin et al. | |
| 8,280,537 B2 | 10/2012 | Chand et al. | |
| 8,311,972 B2 | 11/2012 | Barker | |
| 2004/0162741 A1 | 8/2004 | Flaxer et al. | |

(Continued)

FOREIGN PATENT DOCUMENTS

EP 0225735 A1 * 6/1987 .......... G06K 9/6297

OTHER PUBLICATIONS

Lihong Jiang et. al., A Multi-views Modeling Approach for Product Lifecycle Management in Supply Chain, IEEE International Conference on Computer Supported Cooperative Work in Design, IEEE 16th Conference, May 2012, pp. 533-539 (Year: 2012).*

(Continued)

*Primary Examiner* — Amanda Gurski
(74) *Attorney, Agent, or Firm* — Cuenot, Forsythe & Kim, LLC

(57) ABSTRACT

Cross-domain integration within product lifecycle management can include providing a plurality of finite state machines (FSMs), wherein each FSM is associated with one business object of an integration flow between a first enterprise information system and a second enterprise information system. Each FSM defines a plurality of lifecycle states of the associated business object. A business rule can be associated with each lifecycle state of each FSM. For each FSM, the associated business rules are independent of the FSM. For a selected lifecycle state of each FSM, the associated business rule defines a condition causing a transition from the selected lifecycle state to a next lifecycle state of the FSM. A network of the plurality of FSMs is established by providing communication links among individual ones of the plurality of FSMs according to the business rules. The communication links define the integration flow.

12 Claims, 3 Drawing Sheets

(56) References Cited

U.S. PATENT DOCUMENTS

| | | | |
|---|---|---|---|
| 2005/0043982 A1* | 2/2005 | Nguyen | G06Q 10/06316 705/7.26 |
| 2005/0171910 A1 | 8/2005 | Wu et al. | |
| 2009/0024647 A1 | 1/2009 | Hein | |
| 2009/0043592 A1 | 2/2009 | Heimann et al. | |
| 2009/0083711 A1* | 3/2009 | Singh | G06F 8/71 717/121 |
| 2009/0089625 A1 | 4/2009 | Kannappan et al. | |
| 2011/0179090 A1 | 7/2011 | Sivaram et al. | |

OTHER PUBLICATIONS

Kothe, M. et al., "Mexico—MOF 2 / Express Integration and Coexistence," OMG TC Meeting, Jun. 28, 2006, 37 pgs.

Jiang et al., "A Multi-Views Modeling Approach For Product Lifecycle Management In Supply Chain", CSCWD, Proceedings, IEEE 16th Inter. Conf. on, May 23-25, 2012, pp. 533-539.

Khedher et al., "Integration Between MES And Product Lifecycle Management" ETFA IEEE 16th Conference on, Sep. 5-9, 2011, pp. 1-8.

"ProSTEP iViP Documentation Usage Guide for OMG PLM Services 2.0," [online] ProSTEP iViP Association © Version 2.0.0 Nov. 3, 2008 [retrieved Mar. 19, 2013] retrieved from the Internet: <http://goo.gl/JHrPH>, 116 pg.

* cited by examiner

CROSS DOMAIN INTEGRATION IN PRODUCT LIFECYCLE MANAGEMENT

BACKGROUND

Product lifecycle management (PLM) is the process of managing a product throughout all phases of the life, or lifecycle, of the product. PLM, for example, may begin at the conception phase of a product and continue through design, manufacture, service, and disposal of the product. Typically, each phase of the lifecycle of a product is handled by one or more different Enterprise Information Systems (EISs). Accordingly, two or more EISs often must communicate with one another in order to effectuate PLM.

Communicating across EIS domains generally requires a significant amount of data processing. For example, in order for one EIS to communicate with another EIS, the data being shared may require transformation with regard to structure, i.e., schema, and content, i.e., values. Often, the systems that perform the cross-domain data processing and facilitate inter-EIS communication comingle processing logic with control logic. Combining processing logic with control logic results in a monolithic system.

Most EISs, however, are heavily customized when implemented within an organization. The installation of a particular EIS within one organization is unlikely to be the same as another installation of the same EIS within another organization. These customizations continue over time resulting in ever-changing EISs. Adapting a monolithic system tasked with establishing cross domain communication between two EISs under these circumstances can be a time consuming and complex task. Adapting such a system typically requires redesign by skilled software developers that possess a high degree of familiarity with the system being modified.

BRIEF SUMMARY

A method includes providing a plurality of finite state machines, wherein each finite state machine is associated with one business object of an integration flow between a first enterprise information system and a second enterprise information system. Each finite state machine defines a plurality of lifecycle states of the associated business object. The method also includes associating a business rule with each lifecycle state of each finite state machine. For each finite state machine, the associated business rules are independent of the finite state machine. For a selected lifecycle state of each finite state machine, the associated business rule defines a condition for transitioning from the selected lifecycle state to a next lifecycle state of the finite state machine. A network of the plurality of finite state machines is established by providing communication links among individual ones of the plurality of finite state machines according to the business rules. The communication links define the integration flow.

A system includes a processor programmed to initiate executable operations. The executable operations include providing a plurality of finite state machines, wherein each finite state machine is associated with one business object of an integration flow between a first enterprise information system and a second enterprise information system. Each finite state machine defines a plurality of lifecycle states of the associated business object. The executable operations also include associating a business rule with each lifecycle state of each finite state machine. For each finite state machine, the associated business rules are independent of the finite state machine. For a selected lifecycle state of each finite state machine, the associated business rule defines a condition for transitioning from the selected lifecycle state to a next lifecycle state of the finite state machine. The executable operations further include establishing a network of the plurality of finite state machines by providing communication links among individual ones of the plurality of finite state machines according to the business rules. The communication links define the integration flow.

A computer program product for cross domain integration in product lifecycle management includes a computer readable storage medium having program code stored thereon. The program code is executable by a processor to perform a method. The method includes providing, using the processor, a plurality of finite state machines, wherein each finite state machine is associated with one business object of an integration flow between a first enterprise information system and a second enterprise information system. Each finite state machine defines a plurality of lifecycle states of the associated business object. The method also includes associating, using the processor, a business rule with each lifecycle state of each finite state machine. For each finite state machine, the associated business rules are independent of the finite state machine. For a selected lifecycle state of each finite state machine, the associated business rule defines a condition for transitioning from the selected lifecycle state to a next lifecycle state of the finite state machine. The method further includes establishing a network of the plurality of finite state machines by providing communication links among individual ones of the plurality of finite state machines according to the business rules. The communication links define the integration flow.

DETAILED DESCRIPTION

Figure 1:
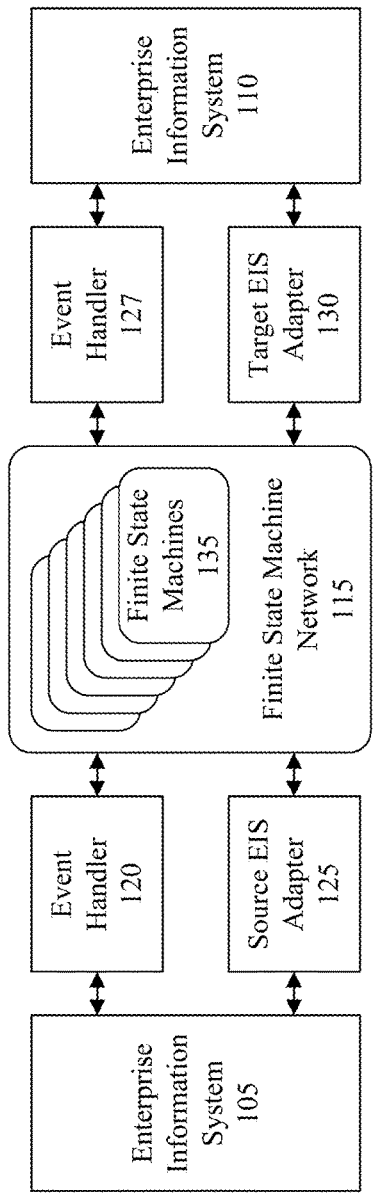
FIG. 1 is a block diagram illustrating an exemplary integration flow between two enterprise information systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to cross-domain integration within a product lifecycle management (PLM) process. In accordance with the inventive arrangements disclosed within this specification, a network of finite state machines is implemented to facilitate cross-domain integration. Rather than utilize a monolithic system in which processing logic is comingled with control logic, each finite state machine of the network of finite state machines is correlated with a particular business object.

The business object is processed through a plurality of lifecycle states defined within the finite state machine associated with the business object. Business rules, which exist external to, and independent of, the finite state machines, are used to control transitions from one lifecycle state to another. A transition can be from one lifecycle state to a different lifecycle state within a same finite state machine or from one lifecycle state in a first finite state machine to a lifecycle state within a second and different finite state machine. As a result, cross-domain integration becomes a flexible process that is adaptable to changing environments through modification of the business rules. Moreover, the adaptability of the system is realized through user administration of the business rules.

FIG. 1 is a block diagram illustrating an exemplary integration flow between two enterprise information systems (EISs). FIG. 1 illustrates an example of an integration flow between an EIS 105 and an EIS 110. Both EIS 105 and EIS 110 communicate with a finite state machine network 115 through event handlers 120 and 127 respectively and the respective adapters, i.e., source EIS adapter 125 and target EIS adapter 130.

For purposes of discussion and illustration, it should be appreciated that each of the illustrated blocks, e.g., EIS 105, EIS 110, event handler 120, source EIS adapter 125, event handler 127, target EIS adapter 130, and finite state machine network 115 can be implemented by one or more data processing systems. In one or more other aspects, one or more of the illustrated blocks can be implemented within a same data processing system. The various blocks further are communicatively linked via an appropriate communication network. Examples of a communication network include, but are not limited to, a WAN, a LAN, a wireless network, a mobile network, a Virtual Private Network (VPN), the Internet, the Public Switched Telephone Network (PSTN), or the like.

For purposes of discussion and illustration, EIS 105 is referred to as a source system since EIS 105 is sending or providing data. EIS 110 is referred to as a target EIS system since EIS 110 receives data from EIS 105. In one aspect, the data that is provided from EIS 105 to EIS 110 is a business object. A business object is an electronic document that can be specified in any of a variety of different formats, e.g., eXtensible Markup Language (XML) or the like. A non-exhaustive list of business object examples includes a customer order, an engineering change order, a bill of materials, or the like. The business object passed from EIS 105 to EIS 110 crosses a domain boundary in reference to leaving EIS 105 and entering EIS 110.

Typically, EIS 105 utilizes one or more different business objects. EIS 110 also utilizes one or more different business objects. The business objects utilized by each respective EIS, however, vary in accordance with the function (type) of the system, the manufacturer of the system, etc. As a result, in order to pass a business object from EIS 105 to EIS 110, the business object typically must undergo processing. The business object is originally formatted for use by EIS 105. After processing, e.g., which may include changes to the structure (schema) and/or content (values) of the business object, the resulting business object is formatted for use by EIS 110.

Consider an example in which EIS 105 is implemented as a product data management system used by an engineering group for purposes of product conceptualization and design. EIS 110 is implemented as an enterprise resource planning (ERP) system. As noted, the data passed from EIS 105 to EIS 110 is a business object. In the example pictured in FIG. 1, the business object can be an engineering change order. As such, the business object is a complex data structure specifying a large amount of data. The engineering change order can include several different portions that specify the particular change to be made, the parts that are affected, etc.

Event handler 120 passes an event, such as a notification of the arrival of an engineering change order for processing to finite state machine network 115. Source EIS adapter 125 is configured to extract data from the business object and provide the extracted data to one or more finite state machines 135. One or more finite state machines 135 operate upon the received business object. The result from finite state machines 135 is provided to target EIS adapter 130, which can perform any necessary formatting changes required for EIS 110 to understand and/or interpret the received results. An event indicating the availability of data is passed from finite state machines 135 to EIS 110 through event handler 127.

Figure 2:
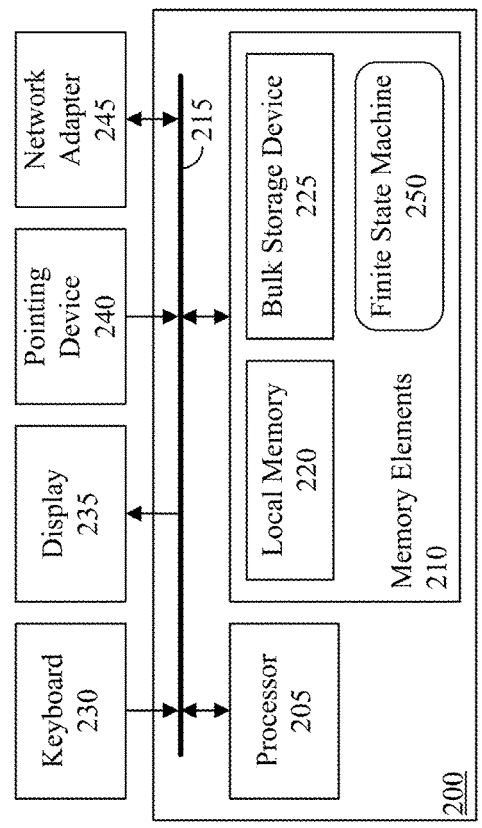
FIG. 2 is a block diagram illustrating an example of a data processing system.

FIG. 2 is a block diagram illustrating an example of a data processing system (system) 200. System 200 can include at least one processor, e.g., a central processing unit, 205 coupled to memory elements 210 through a system bus 215 or other suitable circuitry. As such, system 200 can store program code within memory elements 210. Processor 205 executes the program code accessed from memory elements 210 via system bus 215 or the other suitable circuitry.

In one aspect, system 200 is implemented as a computer or other programmable data processing apparatus that is suitable for storing and/or executing program code. It should be appreciated, however, that system 200 can be implemented in the form of any system including a processor and memory that is capable of performing and/or initiating the functions and/or operations described within this specification.

Memory elements 210 include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200.

As pictured in FIG. 2, memory elements 210 can store one or more finite state machines such as finite state machine 250. Finite state machine 250, being implemented in the form of executable program code, is executed by system 200 and, as such, is considered an integrated part of system 200. Finite state machine 250 can process a business object through a variety of lifecycle states. Moreover, finite state machine 250, business rules, events, and any data utilized by system 200 are functional data structures that impart functionality when employed as part of system 200.

Figure 3:
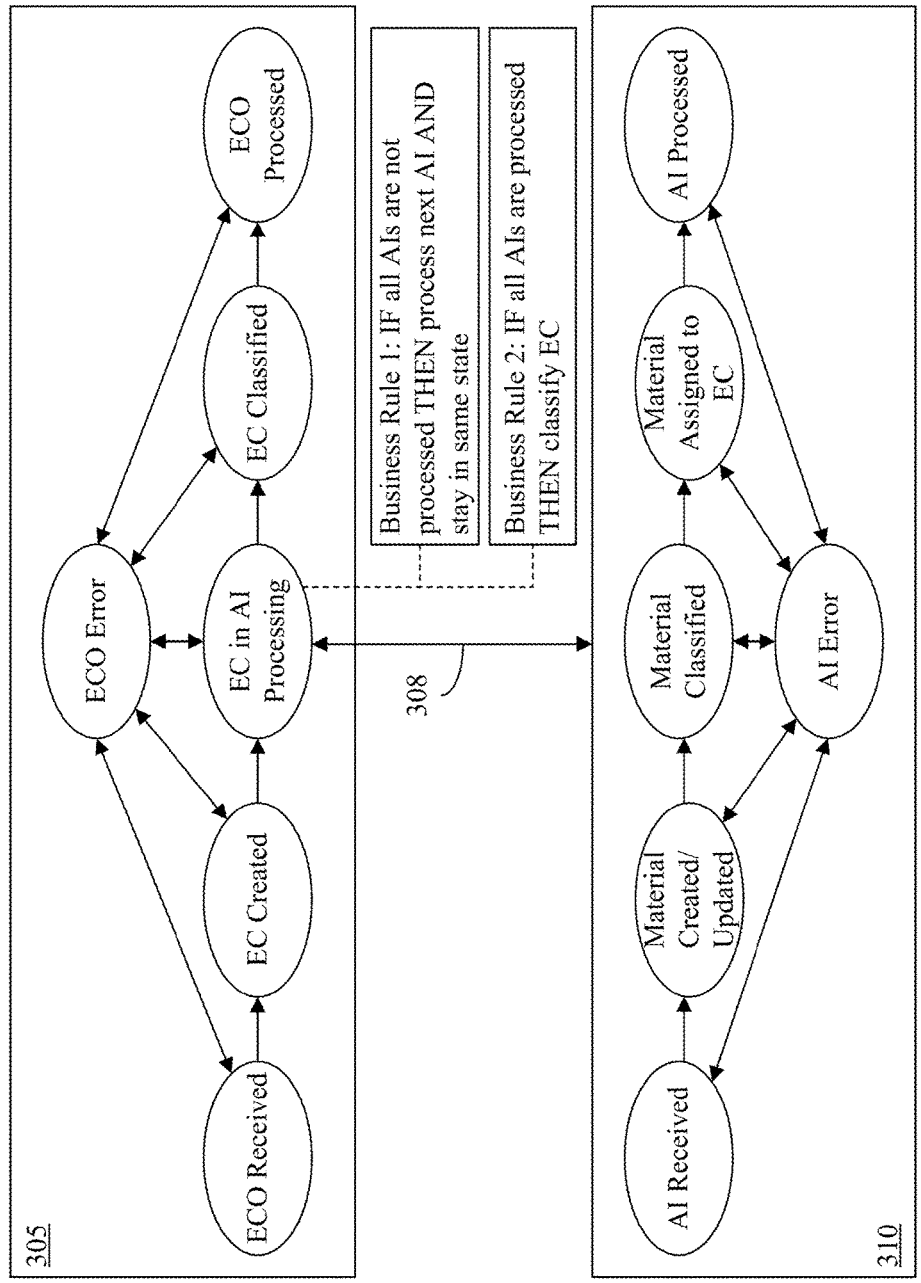
FIG. 3 is a block diagram illustrating an exemplary finite state machine network.

FIG. 3 is a block diagram illustrating an exemplary finite state machine network 300. Finite state machine network 300 is a more detailed example of finite state machine network 115, or a portion thereof, of FIG. 1. FIG. 3 illustrates a finite state machine 305 and a finite state machine 310. Each of finite state machines 305 and 310 is configured to operate upon a particular type of business object. For purposes of illustration, finite state machine 305 is configured to process an engineering change order, or "ECO," type of business object. Finite state machine 310 is configured to process an affected item, or "AI," type of business object.

For purposes of discussion, each engineering change order can specify, or include, one or more affected items. While two or more business objects may be independent of one another and processed separately, FIG. 3 illustrates a case in which two business objects are hierarchically organized in that multiple ones of one business object are included within another higher level business object.

FIG. 3 further illustrates that each business object is associated with a particular finite state machine. Each business object has a lifecycle with a plurality of lifecycle states. The finite state machine for a given business object specifies the various lifecycle states of the associated business object.

For example, finite state machine 305 processes only engineering change orders. The lifecycle states for an engineering change order type of business object can include "ECO Received," "EC Created," "EC in AI Processing," "EC Classified," "ECO Processed," and "ECO Error," where "EC" means "engineering change." Finite state machine 310 processes only affected items. The lifecycle states for an affected item include "AI Received," "Material Created/Updated," "Material Classified," "Material Assigned to EC," "AI Processed," and "AI Error."

Each lifecycle state within a finite state machine is associated with one or more business rules. The business rules for a particular lifecycle state include one or more logical expressions. A condition is determined, or interpreted, to exist by evaluating the logical expression(s) of a business rule. For example, a particular condition is found to exist when the logical expression(s) of a business rule are evaluated to true or evaluated to false. One or more operations can be performed, as specified by the evaluated business rule(s), according to the particular condition that is found to exist. In this regard, a business rule can be said to specify or define a condition since the business rule includes the logical expressions to be evaluated to interpret whether the condition exists. Examples of operations that can be performed include transitioning to a different lifecycle state, whether within a same finite state machine or a different finite state machine, operating upon the schema of a business object, operating upon content of the business object, or the like.

For example, as an engineering change order is received by finite state machine 305, the business object is initially in the "ECO Received" lifecycle state. When the conditions, as specified by one or more business rules associated with the "ECO Received" state are met, one of the operations to be performed is transitioning the lifecycle state of the engineering change order to "EC Created." When the conditions for "EC Created" are met, as specified by the business rules associated with the "EC Created" lifecycle state, the operations to be performed include transitioning the lifecycle state of the engineering change order to "EC in AI Processing."

More generally, a business object enters a specific lifecycle state and the business rules associated with that lifecycle state are evaluated. If a business rule requires an operation to be performed when the logical expression(s) of the business rule are evaluated or determined to be true, e.g., the condition being that the logical expression(s) evaluated to true, the operation is executed. If the condition is determined not to exist, e.g., the logical expression(s) of the business rule evaluate to false, the operation for the rule is not executed. Further exemplary operations for business rules include, but are not limited to, a data transformation, outputting a processing result to a specified destination, invoking or calling a child or other dependent finite state machine, or the like.

FIG. 3 shows two different exemplary business rules associated with the "EC in AI Processing" lifecycle state. While business rules are associated with different lifecycle states of a finite state machine, the business rules exist independently and separately from the finite state machines. As such, business rules can be modified as required to change the behavior of the finite state machine. The finite state machine itself, however, requires no modification. As used herein, "modify," "modified," "modification," or other variant, as applied to business rules, means adding a business rule, deleting a business rule, or changing an existing business rule.

Referring again to FIG. 3, business rule 1 states that "IF all AIs are not processed THEN process next AI AND stay in same state". Business rule 2 states that "IF all AIs are processed THEN classify EC". Thus, while affected items remain to be processed, the engineering change order remains in the "EC in AI Processing" lifecycle state. When all of the affected items of the engineering change order are processed, then the lifecycle state of the engineering change order becomes "EC Classified."

In one aspect, the business rules can be specified using natural language, e.g., English or other language in text form, which can be interpreted or run by a business rules engine. The business rules are not specified, for example, using a procedural and/or object oriented programming language requiring some form of compilation that may be integrated with the finite state machines. This allows business rules to be modified by a user of the system without programming expertise or in-depth knowledge of the system at any time to adapt the system to changing conditions. For example, through modification of the applicable business rules a user can change the conditions that must exist to transition to a different lifecycle state. Through modification of the applicable business rules, a user can change the order in which the business object transitions through lifecycle states, can skip lifecycle states, or the like.

FIG. 3 further illustrates that finite state machine 305 utilizes finite state machine 310 to process affected items. As shown, when the engineering change order is in the "EC in AI Processing" lifecycle state, business rule 1 indicates that affected items are to be processed, e.g., using finite state machine 310, while affected items remain to be processed. Accordingly, as shown, finite state machine 305 is in communication with finite state machine 310 through communication link 308.

Communication links between finite state machines, e.g., communication link 308, are not constructed at build time. Rather, the communication links are established at runtime when the finite state machine network is activated. Communication links between finite state machines can be established using any of a variety of known communication protocols. One exemplary way of establishing the communication links is through the exchange of messages. The communication links, when established at runtime, define the integration flow. The communication links are established according to the business rules. Further, the communication links, like the finite state machines, are independent of the business rules.

Each affected item can be processed through the different lifecycle states shown for finite state machine 310. Again, each lifecycle state can be associated with one or more business rules that define conditions that must exist in order to perform one or more operations, whether data transformations (schema and/or content), transitioning to a different and designated lifecycle state, generating an event, or the like.

As noted, the business rules allow a significant amount of adaptability with the finite state machines. In still another example, the business rules can specify the particular conditions that must exist to transition to an error lifecycle state such as "ECO Error" in finite state machine 305 or "AI Error" in finite state machine 310. By defining the conditions that must be met to initiate an error handling operation using business rules, the behavior of the system can be modified from day to day.

As an example, consider a case in which a particular error occurs during processing of a business object. In some cases, a user may anticipate an error, but not know the corrective action to be taken in response to that error. In that case, the business rules can indicate that processing should be stopped responsive to the error being detected. The error, for example, may cause the finite state machine to move to an error lifecycle state and stop or pause processing. This allows the user to evaluate the error in more detail and devise a recovery strategy for the error.

Once the error is understood, the business rules can be modified to include an error handling or recovery operation. The business rules can be modified so that the finite state machine does not stop responsive to detecting the error, but rather applies the error handling and/or recovery operation. Such flexibility is implemented by the users of finite state machine network 300 through the business rules as required on an ongoing basis without requiring knowledge of high level programming techniques, redesign of the system, recompiling, etc.

By comparison, when using a single, monolithic structure for integration flow, the entire system may stop or pause responsive to an error. In some examples, such a system may require hours to process a single business object. Stopping or pausing during that process means that the entire process may be required to restart anew. Moreover, the behavior of the system is, in effect, "hard coded" since the processing logic and control logic are comingled. Changing the behavior of the system requires re-programming meaning that one or more aspects of the system must be re-coded, recompiled, etc. Thus, if and/or when a recovery procedure is devised for the error, the procedure may only be implemented by the vendor of the system and/or a skilled developer having an in-depth knowledge of the system.

With the flexibility of using business rules, further modifications to an integration flow can be accommodated such as the addition of a new business system into the integration flow. The business rules can be modified to reference or communicate with the new business system.

Finite state machine network 300 includes one finite state machine for each business object. The finite state machine handles the lifecycle of the business object relative to the integration flow. In this manner, the collective state vector of finite state machine network 300 represents the progress of the integration flow at any moment in time. While the lifecycle states of a finite state machine are fixed, the ordering of the lifecycle states, the conditions causing transition from one lifecycle state to another, other operations referenced and/or called within a given lifecycle state, and whether a particular lifecycle state is visited at all can be controlled through the business rules.

Figures 4, 5:
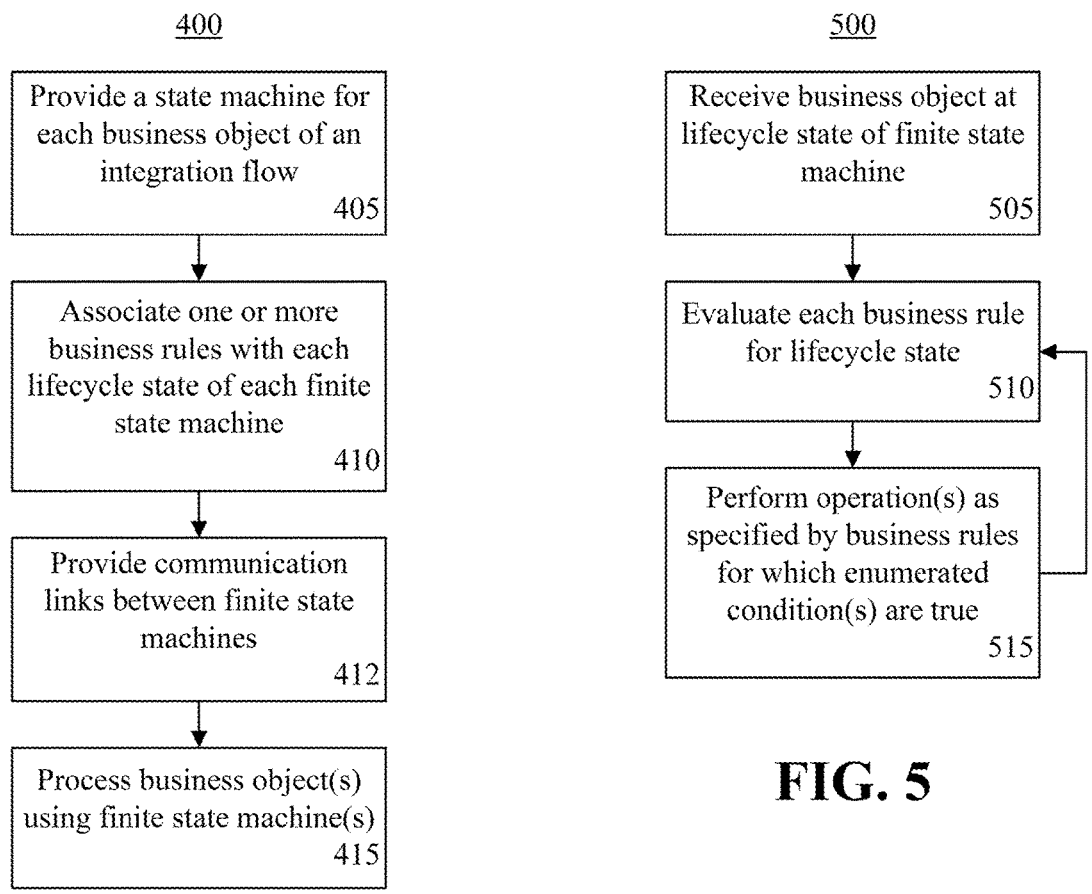
FIG. 4 is a flow chart illustrating an exemplary method of cross-domain integration.
FIG. 5 is a flow chart illustrating an exemplary method of processing a business object.

FIG. 4 is a flow chart illustrating an exemplary method 400 of cross-domain integration. One or more aspects of method 400 can be performed or implemented by a data processing system as described with reference to FIG. 2.

Method 400 can begin in block 405 where a finite state machine is provided for each business object of an integration flow between two or more different EISs. As discussed, each finite state machine defines the lifecycle states for a particular business object.

In block 410, one or more business rules are associated with each lifecycle state of each finite state machine. As noted, each business rule specifies one or more conditions that, when met, cause one or more operations to be performed. Exemplary types of operations include transitioning to a different lifecycle state and indicating the particular lifecycle state to which the finite state machine is to transition for the current business object, remaining in the current lifecycle state, invoking another finite state machine, generating an event which may cause one or more other business rules to initiate operations whether in the same finite state machine or a different finite state machine and whether in the same lifecycle state or a different lifecycle state.

In block 412, the communication links are provided between the finite state machines of block 405. Providing the communication links between the finite state machines establishes the network of finite state machines and defines the integration flow. As noted, the communication links are established at runtime according to the business rules.

In block 415, the business object(s) are processed using the appropriate finite state machine(s). As discussed, the business rules effectively define the interoperability, or networking and communication among the various finite state machines used in a given integration flow.

FIG. 5 is a flow chart illustrating an exemplary method 500 of processing a business object. Method 500 can be performed by a data processing system such as the system described with reference to FIG. 2. Method 500 can begin in block 505, where a business object is received at a lifecycle state of a finite state machine. For example, the business object can be received from a source EIS or an adapter of the source EIS. The finite state machine may be notified of the business object via an event received from an event handler of the source EIS. In any case, responsive to receiving the business object, the finite state machine that is dedicated for processing the business object enters a particular lifecycle state. In this case, the selected lifecycle state is the first or starting lifecycle state of the finite state machine.

In block 510, the system evaluates each business rule for the selected lifecycle state. More particularly, the system evaluates the condition specified by each business rule associated with the current lifecycle state and determines whether the condition is true. In block 515, the system performs an operation as specified for each business rule that is determined to be true. As noted, the particular operations performed can include transitioning to a selected lifecycle state, invoking a different finite state machine, transforming structure and/or content of the business object, generating one or more events, or the like.

While any of a variety of different operations can be performed for a given lifecycle state, typically the last operation will involve a transition out of the current lifecycle state to a different lifecycle state or end. Accordingly, after block 515, method 500 can loop to block 510 to repeat as may be required for one or more different lifecycle states, whether within the same finite state machine or a different finite state machine. Method 500 can be repeated as required so that any relevant lifecycle states of one or more different finite state machines are visited as specified by the applicable business rules for the business object being processed, including business objects embedded within another higher level business object. The last lifecycle state of the business object, for example, can output the resulting business object from the finite state machine network and provide the resulting business object to the target EIS and/or an adapter for the target EIS. Further, any event(s) necessary can be provided via the event handler for the target EIS.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
    a processor programmed to initiate executable operations comprising:
    providing a plurality of finite state machines, wherein each finite state machine is associated with one business object of an integration flow between a first enterprise information system and a second enterprise information system, and wherein each finite state machine defines a plurality of lifecycle states of the associated business object;
    associating a business rule with each lifecycle state of each finite state machine, wherein for each finite state machine, the associated business rules are independent of the finite state machine, and wherein for a selected lifecycle state of each finite state machine, the associated business rule defines a condition causing a transition from the selected lifecycle state to a next lifecycle state of the finite state machine; and
    establishing a network of the plurality of finite state machines by providing communication links among individual ones of the plurality of finite state machines according to the business rules, wherein the communication links define the integration flow.

2. The system of claim 1, wherein the processor is further programmed to initiate an executable operation comprising:
    processing, using a selected one of the plurality of finite state machines, a business object associated with the selected finite state machine as part of the integration flow.

3. The system of claim 1, wherein the business rule specifies the next lifecycle state.

4. The system of claim 1, wherein the processor is further programmed to initiate an executable operation comprising:
    receiving a user input specifying a business rule modification that changes the condition necessary to transition from the selected lifecycle state to the next lifecycle state for at least one finite state machine.

5. The system of claim 1, wherein the processor is further programmed to initiate an executable operation comprising:
    receiving a user input specifying a business rule modification that changes an ordering of the selected lifecycle state and the next lifecycle state within at least one finite state machine.

6. The system of claim 1, wherein the business rules are editable by a user of the system.

7. The system of claim 1, wherein the processor is further programmed to initiate an executable operation comprising:
    associating a business rule with a selected finite state machine specifying exception handling.

8. The system of claim 2, wherein processing, using a selected one of the plurality of finite state machines, a business object associated with the selected finite state machine as part of the integration flow comprises:
    performing at least one of a schema modification or a content modification on the business object according to a business rule associated with the selected finite state machine.

9. A computer program product for cross domain integration in product lifecycle management, the computer program product comprising a computer readable storage medium having program code stored thereon, the program code executable by a processor to perform a method comprising:
    providing, using the processor, a plurality of finite state machines, wherein each finite state machine is associated with one business object of an integration flow between a first enterprise information system and a second enterprise information system, and wherein each finite state machine defines a plurality of lifecycle states of the associated business object;

associating, using the processor, a business rule with each lifecycle state of each finite state machine, wherein for each finite state machine, the associated business rules are independent of the finite state machine, and wherein for a selected lifecycle state of each finite state machine, the associated business rule defines a condition causing a transition from the selected lifecycle state to a next lifecycle state of the finite state machine; and establishing, using the processor, a network of the plurality of finite state machines by providing communication links among individual ones of the plurality of finite state machines according to the business rules, wherein the communication links define the integration flow.

10. The computer program product of claim 9, wherein the method further comprises:
processing, using a selected one of the plurality of finite state machines executing on a processor, a business object associated with the selected finite state machine as part of the integration flow.

11. The computer program product of claim 9, wherein the business rule specifies the next lifecycle state.

12. The computer program product of claim 9, wherein the method further comprises:
receiving a user input specifying a business rule modification that changes the condition necessary to transition from the selected lifecycle state to the next lifecycle state of at least one finite state machine; or receiving a user input specifying a business rule modification that changes an ordering of the selected lifecycle state and the next lifecycle state within at least one finite state machine.

* * * * *